(12) United States Patent
Dai

(10) Patent No.: US 8,737,749 B2
(45) Date of Patent: May 27, 2014

(54) IMAGE PROCESSING APPARATUS, IMAGE PROCESSING METHOD, AND MEDIUM STORING IMAGE PROCESSING PROGRAM

(75) Inventor: Xiaoyan Dai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 964 days.

(21) Appl. No.: 12/545,375

(22) Filed: Aug. 21, 2009

(65) Prior Publication Data
US 2010/0067791 A1  Mar. 18, 2010

(30) Foreign Application Priority Data

Sep. 12, 2008  (JP) ................................. 2008-235589

(51) Int. Cl.
*G06K 9/62*  (2006.01)
(52) U.S. Cl.
USPC .......................................... 382/225; 382/167
(58) Field of Classification Search
USPC ................................................. 382/167, 225
See application file for complete search history.

(56) References Cited

U.S. PATENT DOCUMENTS

| | | | |
|---|---|---|---|
| 5,418,596 A * | 5/1995 | Goto .............................. | 396/106 |
| 6,570,612 B1 * | 5/2003 | Saund et al. ................. | 348/218.1 |
| 7,177,483 B2 * | 2/2007 | Saund ........................... | 382/282 |
| 2004/0012700 A1 * | 1/2004 | Okisu et al. .............. | 348/333.01 |
| 2005/0276519 A1 * | 12/2005 | Kitora et al. ................... | 382/305 |
| 2006/0045386 A1 | 3/2006 | Fukuoka et al. | |
| 2007/0025617 A1 | 2/2007 | Dai et al. | |
| 2007/0047835 A1 | 3/2007 | Kondo | |
| 2007/0201758 A1 | 8/2007 | Kuno | |
| 2008/0056616 A1 | 3/2008 | Hasegawa | |

FOREIGN PATENT DOCUMENTS

| | | |
|---|---|---|
| JP | 5-223522 | 8/1993 |
| JP | 2001-167273 | 6/2001 |
| JP | 2004-88191 | 3/2004 |
| JP | 2004-265384 | 9/2004 |
| JP | 2006-162692 | 6/2006 |
| JP | 2006-344069 | 12/2006 |
| JP | 2007-233433 | 9/2007 |
| JP | 2007-272456 | 10/2007 |

OTHER PUBLICATIONS

Tatsuno Koichi, "Digital Camera"; JP_2004088191_Translation, Mar. 18, 2004 pp. 1-21.*
Li Tao, et al., "An Illuminance-Reflectance Nonlinear Video Enhancement Model for Homeland Security Applications", Applied Imagery and Pattern Recognition Workshop Proceedings, Dec. 2005. (Note: First cited in OA dated Jul. 5, 2012 in U.S. Appl. No. 12/545,348.).
Japanese Office Action dated Oct. 1, 2012 issued in related Japanese Application 2008-235589.

* cited by examiner

*Primary Examiner* — Chan Park
*Assistant Examiner* — Eueng-Nan Yeh
(74) *Attorney, Agent, or Firm* — Fitzpatrick, Cella, Harper & Scinto

(57) ABSTRACT

Illumination information indicating the center of illumination and lightness change direction is acquired from an image, and the image is divided into regions for respective colors based on the acquired illumination information and color information of respective pixels included in the image. Especially, thresholds in clustering are set step by step in accordance with the lightness change direction from the center of the illumination information, and the image is clustered to the regions for respective colors according to the thresholds which are set step by step.

13 Claims, 12 Drawing Sheets

F I G. 11
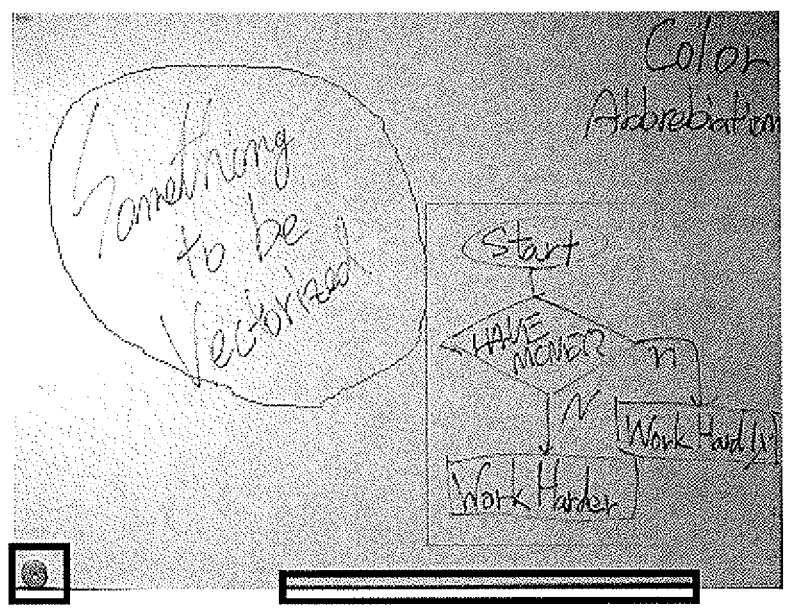

IMAGE PROCESSING APPARATUS, IMAGE PROCESSING METHOD, AND MEDIUM STORING IMAGE PROCESSING PROGRAM

BACKGROUND OF THE INVENTION

1. Field of the Invention

The present invention relates to an image processing apparatus for quantizing an image, an image processing method, and a medium storing an image processing program.

2. Description of the Related Art

In recent years, along with the advance of digitization of information, systems, which scan paper documents using a scanner or the like to convert them into digital document images and to save the digital document images in place of saving these paper documents intact, and transmit such digital document image data to other apparatuses, have prevailed. In such system, in order to reduce transmission cost at the time of transmission, high compressibility is often required for digital documents. Also, reusability that allows to partially edit digital data, and a high image quality property that can assure high image quality even after enlargement or reduction are required. However, when a document image includes both a text region and photo region, if compression suited to a text region is applied, high image quality is assured but the compression ratio becomes low. On the other hand, if compression suited to a photo region is applied, a high compression ratio is assured but characters deteriorate. Hence, it is difficult to meet both high image quality and high compressibility at the same time.

However, in recent years, various techniques have been developed. Japanese Patent Laid-Open No. 2004-265384 describes a technique, which separates a digital document image into a text region and photo region, converts the text region for which the reusability and high image quality property are to be emphasized into vector data, compresses the photo region or the like which cannot be easily reproduced by vector conversion, and composites and outputs the compression results of the respective regions. Also, Japanese Patent Laid-Open No. 2006-344069 describes a technique, which can convert, into vector data, a specific image (illustration) which is included in an image that is compressed so far as a photo, and has features (e.g., such specific image is clear like the contour of an object, and has a limited number of colors). In recent years, with these techniques, high compressibility, high image quality property, and reusability of document images are considered.

In such situation, a vector conversion processing target is not limited to the aforementioned scan image of the paper document. For example, Japanese Patent Laid-Open No. 2006-162692 discloses the following technique. With this technique, an image of a blackboard, whiteboard, or the like is captured by a plurality of cameras, captured images are input to a server, and the color tone characteristics of the plurality of cameras are adjusted so as to attain seamless panoramic composition. Images after color tone correction are panoramically composited, and vector data of writing on the blackboard or whiteboard is generated from the panoramically composited image. Then, the vector data is converted into time-serial Web contents, which are easy to view, and the Web contents are saved.

Characters and figure parts written on the whiteboard have the aforementioned features of the specific image (illustration), i.e., they basically have a limited number of colors, and contours, as described above. Therefore, in an image obtained by capturing an image of the whiteboard or the like using a digital camera, regions are separated for respective colors based on color features, and the contour lines of the respective color regions are converted into vector data, thus realizing the aforementioned high compressibility, high image quality property, and reusability.

On the other hand, an image captured using a digital camera has a feature of readily causing illumination nonuniformity due to the influences of flashlight and illumination conditions unlike an image obtained by scanning a paper document using a scanner.

Therefore, with the conventional vector conversion method, illustration and background parts having similar colors are extracted as one region under the influence of illumination nonuniformity, and an illustration cannot be neatly extracted. Especially, when an input image is a gray image, since there are many illustration parts and background parts having similar density values, an illustration and background cannot be separated.

To solve this problem, vector conversion processing may be executed after an image undergoes lightness correction processing first. However, the lightness correction processing merely removes illumination nonuniformity to some extent, and the aforementioned problem is consequently posed as a result of the vector conversion processing.

SUMMARY OF THE INVENTION

The present invention provides an image processing apparatus, which divides an input image, which suffers illumination nonuniformity and has a large lightness change, into regions for respective colors with high precision.

The present invention in its first aspect provides an image processing apparatus for dividing an image into regions for respective colors, comprising: an acquisition unit configured to acquire, from an image, illumination information indicating a center of illumination and a lightness change direction; and a division unit configured to divide the image into regions for respective colors based on the illumination information acquired by the acquisition unit and color information of respective pixels included in the image.

The present invention in its second aspect provides an image processing method executed by an image processing apparatus for dividing an image into regions for respective colors, the method comprising: an acquisition step of acquiring, from an image, illumination information indicating a center of illumination and a lightness change direction; and a division step of dividing the image into regions for respective colors based on the acquired illumination information and color information of respective pixels included in the image.

The present invention in its third aspect provides a computer-readable medium storing an image processing program for dividing an image to be processed into regions for respective colors, the program making a computer function to: acquire, from an image, illumination information indicating a center of illumination and a lightness change direction; and divide the image into regions for respective colors based on the acquired illumination information and color information of respective pixels included in the image.

The present invention in its fourth aspect provides an image processing apparatus for dividing an image into regions for respective colors, comprising: an acquisition unit configured to acquire, from an image, illumination information indicating a center of illumination and a lightness change direction; a division unit configured to divide the image into regions for respective colors based on the illumination information acquired by the acquisition unit and color information of respective pixels included in the image; a first region identification unit configured to identify, as a background region, a color region including a largest number of pixels of the regions for respective colors divided by the division unit; a second region identification unit configured to identify, as an unnecessary region, a region which neighbors the background region identified by the a first region identification unit and includes the number of pixels not more than a predetermined reference value; an unnecessary region replacing unit configured to replace the identified unnecessary region by the background region; and a conversion unit configured to convert the regions, after the unnecessary region is replaced by the background region, into vector data.

The present invention in its fifth aspect provides an image processing method executed by an image processing apparatus for dividing an image into regions for respective colors, comprising: an acquisition step of acquiring, from the image, illumination information indicating a center of illumination and a lightness change direction; a division step of dividing the image into regions for respective colors based on the illumination information acquired in the acquisition step and color information of respective pixels included in the image; a first region identification step of identifying, as a background region, a color region including a largest number of pixels of the regions for respective colors divided in the division step; a second region identification step of identifying, as an unnecessary region, a region which neighbors the background region identified in the first region identification step and includes the number of pixels not more than a predetermined reference value; an unnecessary region replacing step of replacing the identified unnecessary region by the background region; and a conversion step of converting the regions, after the unnecessary region is replaced by the background region, into vector data.

The present invention in its sixth aspect provides a computer-readable medium storing an image processing program for dividing an image into regions for respective colors, the program making a computer function to: acquire, from the image, illumination information indicating a center of illumination and a lightness change direction; divide the image into regions for respective colors based on the acquired illumination information and color information of respective pixels included in the image; identify, as a background region, a color region including a largest number of pixels of the divided regions for respective colors; identify, as an unnecessary region, a region which neighbors the identified background region and includes the number of pixels not more than a predetermined reference value; replace the identified unnecessary region by the background region; and convert the regions, after the unnecessary region is replaced by the background region, into vector data.

According to the present invention, an image, which suffers illumination nonuniformity and has a large lightness change, can be divided into regions for respective colors with high precision.

Further features of the present invention will become apparent from the following description of exemplary embodiments with reference to the attached drawings.

BRIEF DESCRIPTION OF THE DRAWINGS

FIG. 11 is a view showing an example of an input image including unnecessary parts in the embodiment;

DESCRIPTION OF THE EMBODIMENTS

Figure 1:
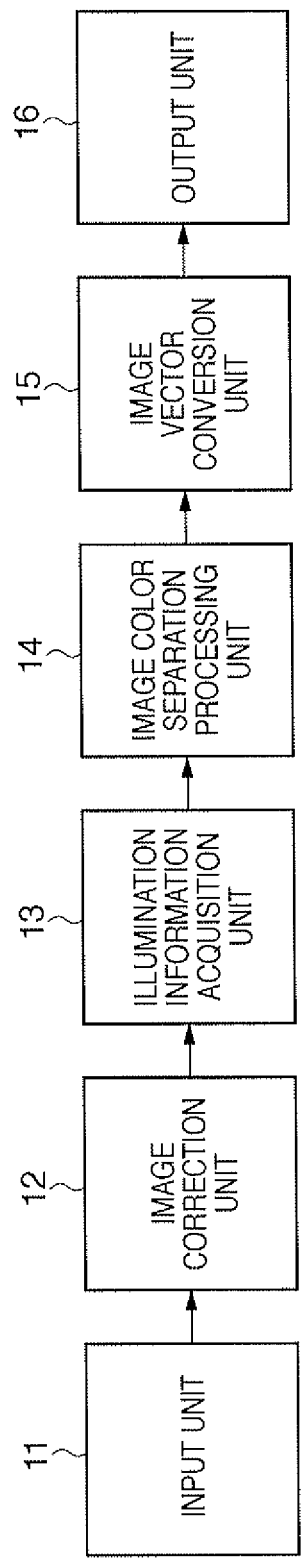
FIG. 1 is a block diagram showing functional blocks of an image processing apparatus, which executes vector conversion of an image that suffers illumination nonuniformity, according to the first embodiment of the present invention.

The best mode for carrying out the present invention will be described in detail hereinafter with reference to the drawings. Note that the same reference numerals denote the same parts throughout the drawings, and a description thereof will not be repeated.

First Embodiment

<Apparatus Arrangement>

FIG. 1 is a block diagram showing functional blocks of an image processing apparatus which executes vector conversion of an image that suffers illumination nonuniformity according to the first embodiment of the present invention. As shown in FIG. 1, this image processing apparatus includes an input unit 11 used to input an image which is captured by a digital camera, includes a specific image, and suffers illumination nonuniformity, and an image correction unit 12 used to apply distortion correction and lightness correction to the input image. Note that the specific image indicates an image (for example, an illustration, an image obtained by capturing that of a whiteboard, etc.) in which the number of colors is limited to a predetermined value or less (for example, 32 colors or less) and a contour is clear. This image processing apparatus also includes an illumination information acquisition unit 13 used to acquire information of a center of illumination and illumination change direction from the image that has undergone the lightness correction processing of the image correction unit 12, and an image color separation processing unit 14 used to separate the image after correction for respective colors. Furthermore, this image processing apparatus includes an image vector conversion unit 15 used to convert contours and color information of respective color regions into vector data, and an output unit 16 used to output the vector result.

Figure 13:
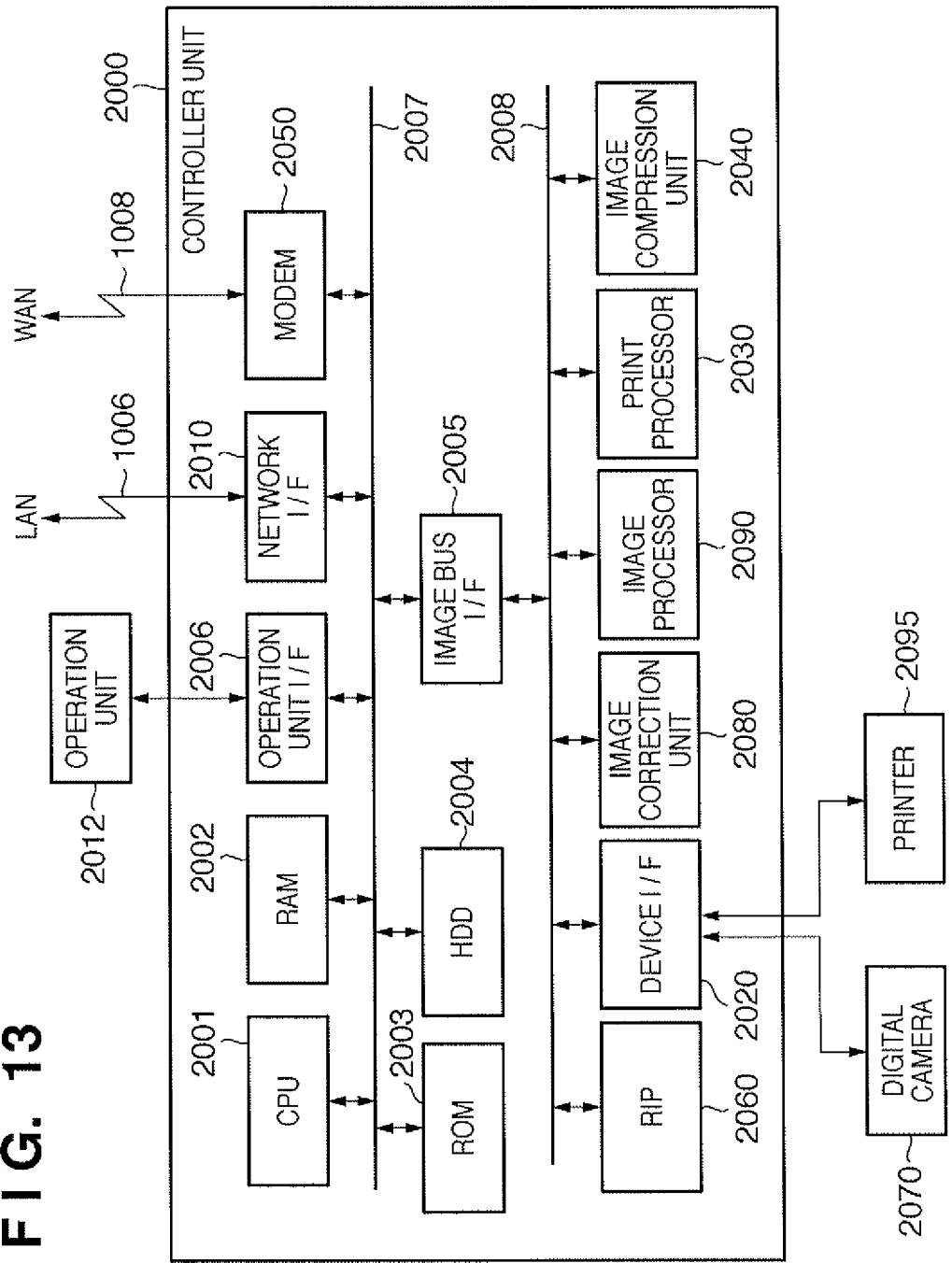
FIG. 13 is a block diagram showing the arrangement of principal part of a digital multifunction peripheral equipment used as the image processing apparatus shown in FIG. 1.

FIG. 13 is a block diagram showing the arrangement of principal part of a digital multifunction peripheral equipment used as an image processing apparatus shown in FIG. 1. Note that in this embodiment, a multifunction peripheral equipment (MFP) having a scanner function and printer function is used as the digital multifunction peripheral equipment. Alternatively, a system which connects a general-purpose scanner and personal computer may be used as the image processing apparatus. Note that "MFP" is an abbreviation for "Multifunction Peripheral". As shown in FIG. 13, this image processing apparatus includes a controller unit 2000. To the controller unit 2000, a digital camera 2070 as an image input device, and a printer 2095 as an image output device are connected. The controller unit 2000 can control to implement a copy function that controls the printer 2095 to print out image data read from a document image by the digital camera 2070. The controller unit 2000 also controls to exchange pattern images, device information, and the like with other apparatuses via a LAN 1006 or public line (WAN) 1008.

As shown in FIG. 13, the controller unit 2000 includes a CPU 2001 which controls respective blocks to be described below. The CPU 2001 launches an operating system (OS) by a boot program stored in a ROM 2003. Then, the CPU 2001 implements various kinds of processing by executing application programs stored in an HDD 2004 as a hard disk drive on this OS. The functional blocks shown in FIG. 1 are implemented by the CPU 2001. That is, the CPU serves as the processing units shown in FIG. 1 by executing a computer program. Note that a RAM 2002 is used as a work area of this CPU 2001. The RAM 2002 also provides an image memory area used to temporarily store image data in addition to the work area of the CPU 2001. The HDD 2004 stores image data together with the aforementioned application programs. Note that in this embodiment, the processing units shown in FIG. 1 are implemented using the CPU. However, the present invention is not limited to this, and some or all of these processing units may be implemented by hardware components such as electronic circuits.

The ROM 2003 and RAM 2002 are connected to the CPU 2001 via a system bus 2007. Furthermore, an operation unit I/F (interface) 2006, network I/F 2010, modem 2050, and image bus I/F 2005 are connected to the CPU 2001.

The operation unit I/F 2006 is an interface with an operation unit 2012 having a touch panel, and outputs image data to be displayed on the operation unit 2012 to the operation unit 2012. Also, the operation unit I/F 2006 outputs information, which is input by the user on the operation unit 2012, to the CPU 2001. The network I/F 2010 is connected to the LAN 1006, and exchanges information with respective apparatuses connected to the LAN 1006 via the LAN 1006. The modem 2050 is connected to the public line 1008, and exchanges information with other apparatuses via the public line 1008.

The image bus I/F 2005 is a bus bridge, which connects the system bus 2007 and an image bus 2008 that transfers image data at high speed, and converts the data structures. The image bus 2008 is configured by a PCI bus or according to IEEE 1394. On the image bus 2008, a raster image processor (RIP) 2060, device I/F 2020, image correction unit 2080, image processor 2090, print processor 2030, and image compression unit 2040 are connected. The RIP 2060 is a processor which rasterizes PDL code data into a bitmap image. The digital camera 2070 and printer 2095 are connected to the device I/F 2020 to convert a synchronous system/asynchronous system of image data. The image correction unit 2080 applies distortion correction and lightness correction to input image data. The image processor 2090 removes illumination nonuniformity from an input image, and executes color separation processing and the like. The print processor 2030 applies image correction, resolution conversion, and the like required to be output to the printer to image data to be printed out. The image compression unit 2040 compresses multi-valued image data to JPEG data and binary image data to data such as JBIG, MMR, or MH data, and also decompresses these data.

<Overview of Vector Conversion Processing of Image that Includes Specific Image (Illustration and Characters) and Suffers Illumination Nonuniformity>

Figure 2:
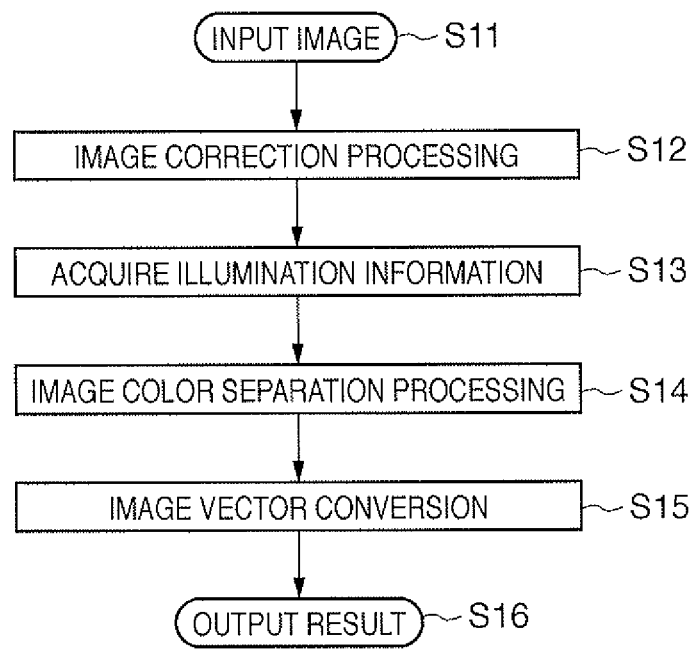
FIG. 2 is a flowchart showing an overview of the sequence of vector conversion processing of an image which includes a specific image (illustration) and suffers illumination nonuniformity.

FIG. 2 is a flowchart showing an overview of the sequence of vector conversion processing of an image which includes a specific image (illustration and characters) and suffers illumination nonuniformity. Assume that this image is obtained by capturing, using a digital camera, an image of a whiteboard on which figures, characters, and the like are written. The CPU 2001 shown in FIG. 13 executes the processes in respective steps shown in FIG. 2. FIG. 2 will be explained below with reference to FIG. 1.

The input unit 11 inputs an image which suffers illumination nonuniformity (step S11). The image correction unit 12 applies distortion correction and lightness correction to the input image (step S12). As this distortion correction method, a known method can be applied. For example, when an image of the whiteboard is captured from an oblique direction, a quadrate distortion occurs. Hence, the four sides of the whiteboard are detected, and distortion correction can be applied to that quadrate to form a rectangle. Note that the four sides of the whiteboard can be detected by detecting, for example, parts in which pixels having a large density difference from neighboring pixels line up. When the whiteboard is used as a target, it is desirable to use only the whiteboard part as a processing target in the subsequent stages (for example, to execute clipping processing to extract only that part) so as to remove the influence of parts other than the whiteboard part. Also, as an example that implements the lightness correction processing, a known Retinex Method can be used. However, in case of an image with a large lightness change, even when the Retinex Method is used, it is difficult to fully correct illumination nonuniformity over the entire image. Therefore, the present invention further executes processing to be described below.

Next, the illumination information acquisition unit 13 acquires illumination information indicating the center of illumination and lightness change direction from the image after lightness correction in step S12 (step S13). As the center of illumination, for example, the position of a brightest part of the image after lightness correction in step S12 is acquired, but the present invention is not limited to this. For example, the image after lightness correction in step S12 may be approximated using a Gaussian mixture distribution, and the center of that Gaussian distribution may be used as the center of illumination. Also, the lightness change direction can be calculated based on, for example, a differential image obtained by differentiating the image after lightness correction in step S12. In this embodiment, thresholds in clustering to be executed in the subsequent step are dynamically set according to the illumination information which is acquired in this step and indicates the center of illumination and lightness change direction.

The image color separation processing unit 14 separates the image into regions (clusters) for respective colors by dynamically setting thresholds in clustering using the illumination information acquired in step S13 and color information of respective pixels included in the image (step S14).

Note that the thresholds in clustering are values used upon determining whether or not the color of a pixel of interest is similar to that of another clustered pixel. That is, in this embodiment, a reference used to determine color similarity is set according to the illumination information.

The image vector conversion unit 15 converts the contours and colors of the respective color regions (clusters) divided in step S14 into vector data (step S15). The output unit 16 outputs the vector result in step S15 (step S16).

Figure 3:
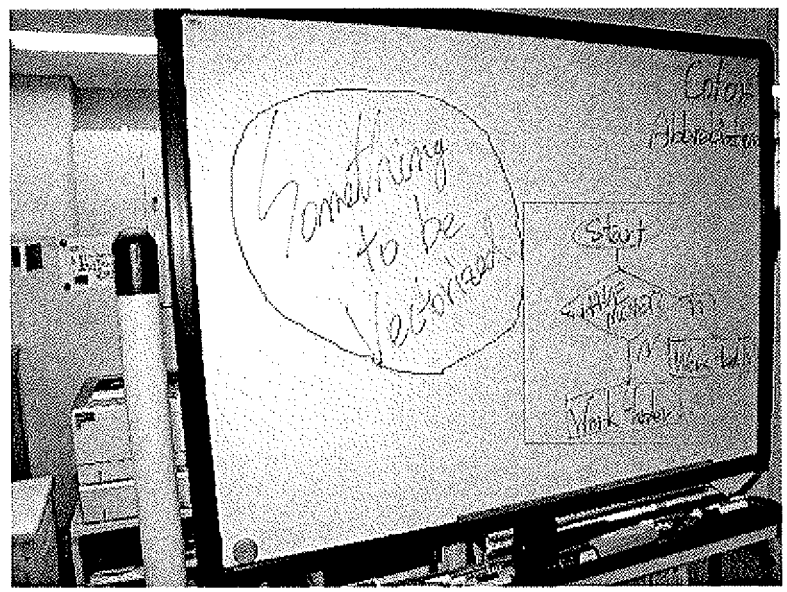
FIG. 3 is a view showing an example of an input image in the embodiment.
Figure 4:
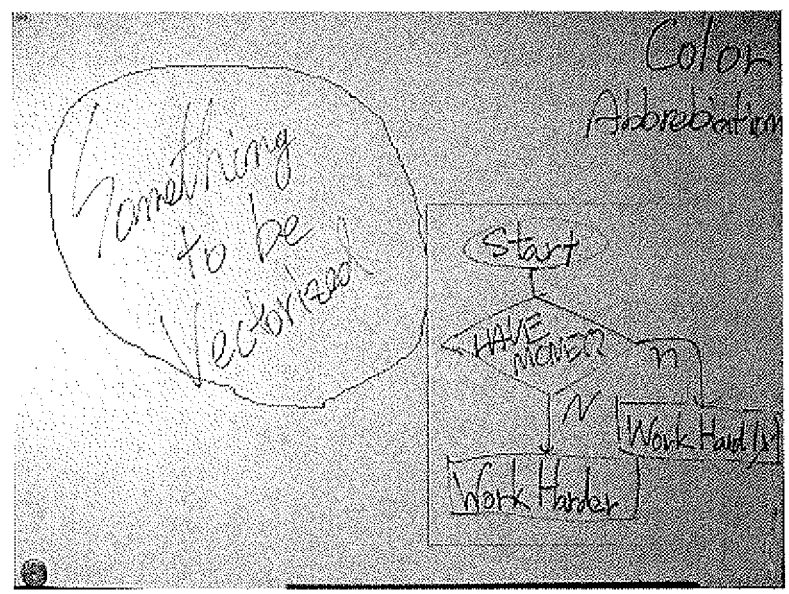
FIG. 4 is a view showing an image after correction processing of the input image in the embodiment.

FIG. 3 is a view showing an example of an input image in this embodiment. That is, FIG. 3 shows an example of the input image used in step S11. The image shown in FIG. 3 is the input image obtained by capturing an image of the whiteboard including colorized text and figure parts using the digital camera. FIG. 4 is a view showing an image after the distortion correction processing and lightness correction processing are applied to the whiteboard part of the input image in this embodiment. FIG. 4 shows the image obtained when the image correction unit 12 applies clipping processing (cut-out processing) to the image (the whiteboard part) after the distortion correction, and then applies the lightness correction processing to the clipped image. That is, FIG. 4 shows an example of the image after execution of the processing in step S12. In the image shown in FIG. 4, a detected distortion is corrected, and illumination nonuniformity is corrected to some extent.

<Image Color Separation Processing>

Figure 5:
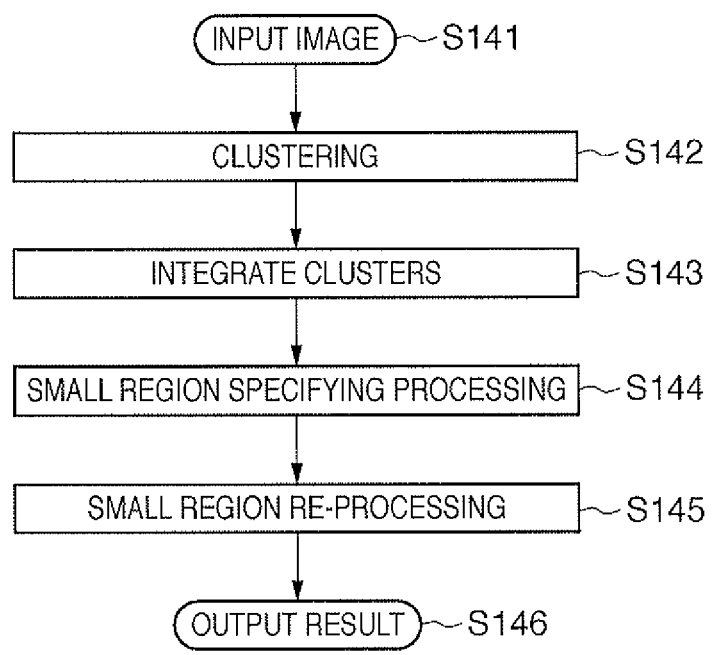
FIG. 5 is a flowchart showing the sequence of color separation processing with respect to an image that suffers illumination nonuniformity in step S14 in FIG. 2.

The color separation processing for the image that suffers illumination nonuniformity in step S14 in FIG. 2 will be described below with reference to FIG. 5. In step S141, the image that has undergone the distortion correction and lightness correction in step S12 shown in FIG. 2 is input to the image color separation processing unit 14.

In step S142, the image color separation processing unit 14 executes region division (clustering) processing for dividing the image into regions including similar colors based on color information of pixels included in the image. In this embodiment, clustering is executed while the thresholds in clustering are dynamically set according to the illumination information which is acquired in step S13 and indicates the center of illumination and lightness change direction. As shown in FIG. 4, even after the processing in step S12, some illumination nonuniformity remains. If only one fixed threshold is used in the image upon clustering, parts that ought to have the same color are unwantedly separated into some regions due to the illumination nonuniformity. As a result, significant parts (foregrounds) such as characters and figures and a background may often undesirably form one region. Hence, this embodiment prevents such problem from being posed by dynamically setting the thresholds according to the illumination information acquired in step S13. In this embodiment, a cluster means a region having an identical color. The clustering processing will be described later with reference to FIG. 6.

In step S143, the image color separation processing unit 14 executes region integration processing for integrating regions based on color information and edge information of clustered regions (to be also referred to as cluster integration processing hereinafter). The processing in step S143 is executed when the number of clustered regions obtained in step S142 is larger than the desired number of clusters, which is determined in advance. In this case, character clusters having similar colors are integrated, and background clusters having similar colors are also integrated. In this embodiment, character and background clusters are prevented from being integrated with reference to the edge information of clusters at the time of integration. The cluster integration processing will be described later with reference to FIG. 7.

In step S144, the image color separation processing unit 14 specifies small regions generated in the cluster integration processing as noise regions. For example, in integrated clusters, small regions in each of which connected pixels have an area of three pixels or less are determined as noise regions. Note that a threshold used to determine a noise region is not limited to three pixels, and is desirably changed according to the type of image to be processed. In step S145, the unit 14 sets noise pixels included in each noise region to be those which belong to a cluster having a closest color of the clusters that neighbor the noise region. That is, in step S145 noise regions are replaced by other regions including pixels having similar colors. In this embodiment, the processes in steps S144 and S145 prevent an increase in data size as a result of conversion of small regions as noise regions into vector data intact.

In step S146, the image color separation processing unit 14 passes the color separation processing result to vector processing (step S15 shown in FIG. 2).

As described above, in this embodiment, upon execution of the color separation processing of the input image which suffers illumination nonuniformity, or upon editing color regions (e.g., upon changing the number of color regions), characters and a background can be prevented from being clustered into an identical cluster. Details of the clustering processing and cluster integration processing in steps S142 and S143 in FIG. 5 will be described below.

<Clustering Processing>

Figure 6:
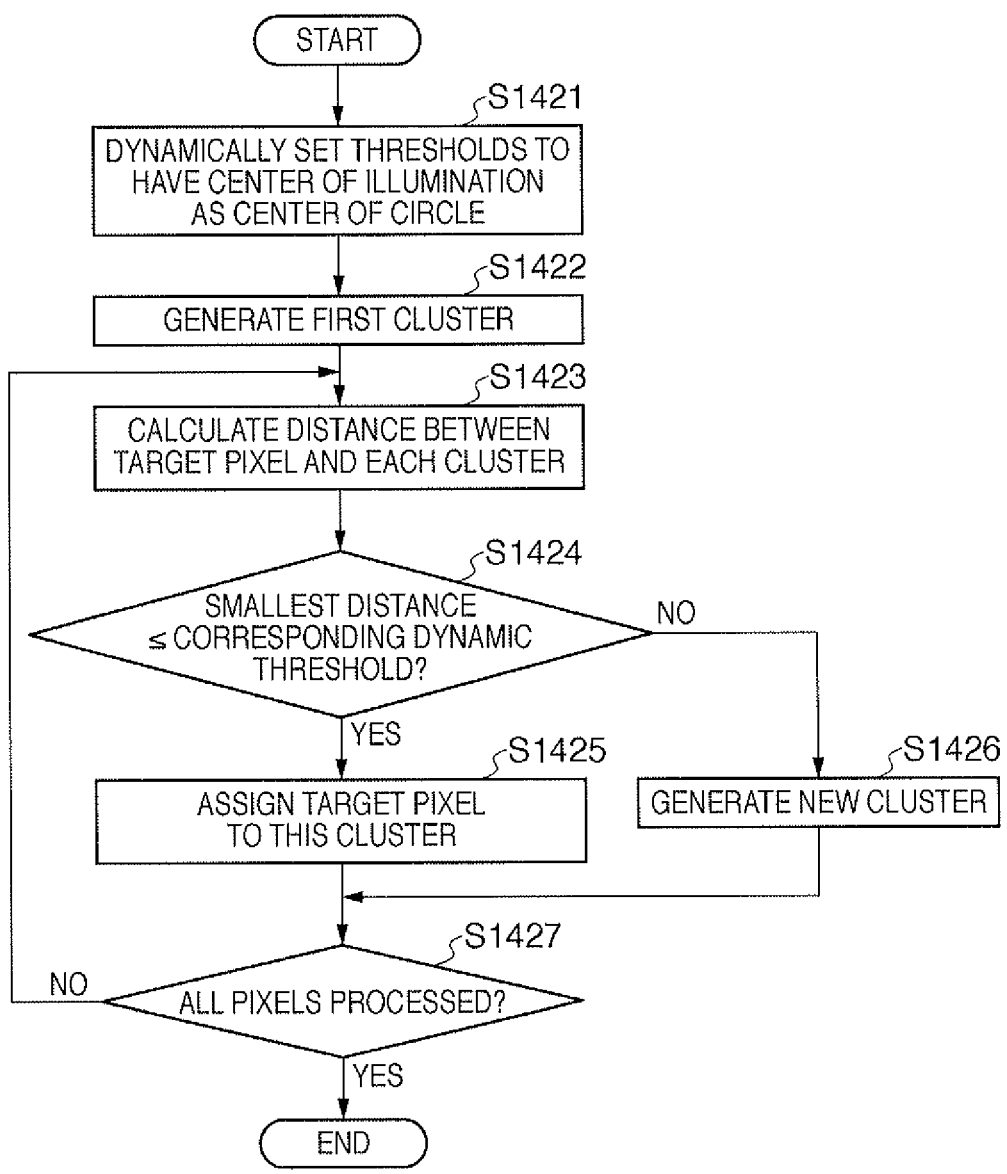
FIG. 6 is a flowchart showing the sequence of clustering processing in step S142 in FIG. 5.
Figure 8:
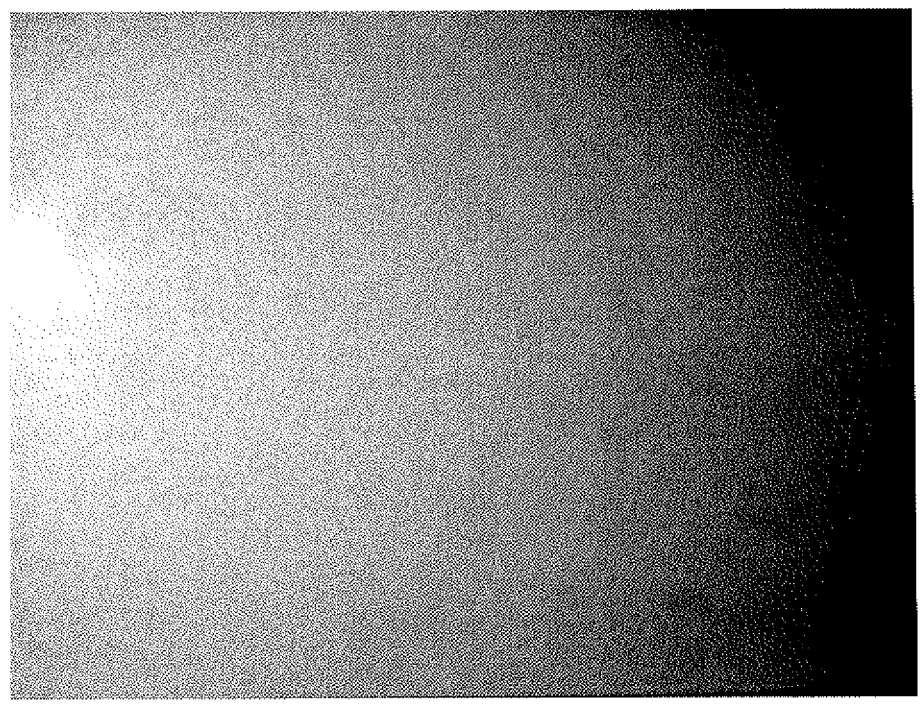
FIG. 8 is a view showing illumination information of an image before lightness correction.

The clustering processing in step S142 in FIG. 5 will be described below with reference to FIG. 6. In step S1421, the image color separation processing unit 14 dynamically sets a plurality of thresholds (those used to determine a foreground and background) used in clustering in accordance with the information which is acquired in step S13 and indicates the center of illumination and lightness change direction. FIG. 8 is a view showing illumination information of the image in FIG. 4 (the image after the image correction processing in step S12). As shown in FIG. 8, a brightest part corresponds to the center of illumination, and the image gradually becomes darker from the center along the lightness change direction. In this embodiment, the thresholds used in clustering are decided step by step based on this feature. An example of threshold setting processing for setting the thresholds in clustering will be described below.

One threshold in clustering is set for pixels which exist within a region which has the center of illumination as a center of circle and has a radius close to the center of circle (for example, $R \leq R1$). Another threshold in clustering is set for pixels which exist within an annular region having a slightly larger radius (for example, $R1 < R \leq R2$). Also, still another threshold in clustering is set for pixels which exist within regions having a still larger radius (for example, a region that meets $R2 < R \leq R3$ and a region that meets $R > R3$). The radii R1, R2, and R3 may be decided as follows. For example, the lightness distribution shown in FIG. 8 may be divided into four regions based on the degrees of lightness change, and distances from the center of illumination to the boundaries of the respective regions may be decided as R1, R2, and R3 in ascending order of distance from the center of illumination. After the regions are determined based on the lightness distribution, the thresholds in clustering are set for respective regions, as described above. Note that the thresholds in clustering are set to be lower step by step with increasing distance from the center of circle. Since the image becomes darker with increasing distance from the center of circle, a color difference between the foreground and background becomes smaller, and a smaller threshold has to be set to separate them. For example, assume that the thresholds in clustering are decided by calculating statics of the color distribution for respective regions (circular or annular regions). For example, when the spread of the color distribution (degree of change) is large, since it is considered that the color difference between the foreground and background is relatively large, a relatively large value is set for a threshold. On the other hand, when the degree of change of the color distribution is small, a relatively small value is set for a threshold. In the above example, the thresholds in clustering are respectively set in the four regions. However, the present invention is not limited to this, and the number of thresholds in clustering changes depending on a lightness change of an image to be processed.

As described above, the thresholds in clustering are set step by step for respective regions according to the lightness change feature caused by an illumination in place of only one threshold common to the entire image. As a consequence, significant parts (foregrounds) such as characters and figures and a background having a similar color can be prevented from being clustered into one region upon clustering due to illumination nonuniformity which cannot be sufficiently corrected by the lightness correction processing in step S12.

Assume that the processes in steps S1422 to S1427 to be described below are executed for each individual region (circular or annular region) set in step S1421.

In step S1422, the image color separation processing unit 14 generates a first cluster for a pixel from which a raster scan is to start. In step S1423, the unit 14 calculates, for the next pixel to be scanned (to be referred to as a target pixel hereinafter), a similarity (i.e., a distance value of a color feature) with each of all clusters which have already been generated at that time. Note that the distance value of a feature amount of the target pixel and that of a cluster is smaller as the similarity is higher. In this embodiment, RGB values are used to calculate the similarity indicating the distance between pixels on a color space. Alternatively, information of other color spaces or information other than colors may be used to calculate the similarity.

In step S1424, the image color separation processing unit 14 acquires a cluster number corresponding to a cluster having a smallest distance value from the target pixel (i.e., a cluster with a highest similarity), and compares that distance value with the threshold dynamically set in step S1421. If the distance value is equal to or smaller than the threshold, the process advances to step S1425 to attach the target pixel to the cluster with the smallest distance value (i.e., the cluster with the highest similarity). On the other hand, if the distance value is larger than the threshold, the process advances to step S1426 to generate a new cluster since it is determined that the target pixel belongs to a cluster different from the clusters already generated at that time. As described above, in this embodiment, the threshold for clustering becomes smaller with increasing distance from the center of illumination. Since a pixel at a position farther from the center of illumination tends to have a smaller distance value between the foreground and background, a threshold used upon determining whether or not that pixel belongs to the generated cluster is set to be smaller. That is, only when a pixel which is located at a position farther from the center of illumination has a smaller distance value (i.e., a higher similarity), it is assigned to the generated cluster.

The image color separation processing unit 14 determines in step S1427 if the processing is complete for all pixels in the image. If pixels to be processed still remain, the processes in steps S1423 to S1427 are repeated.

<Cluster Integration Processing>

Figure 7:
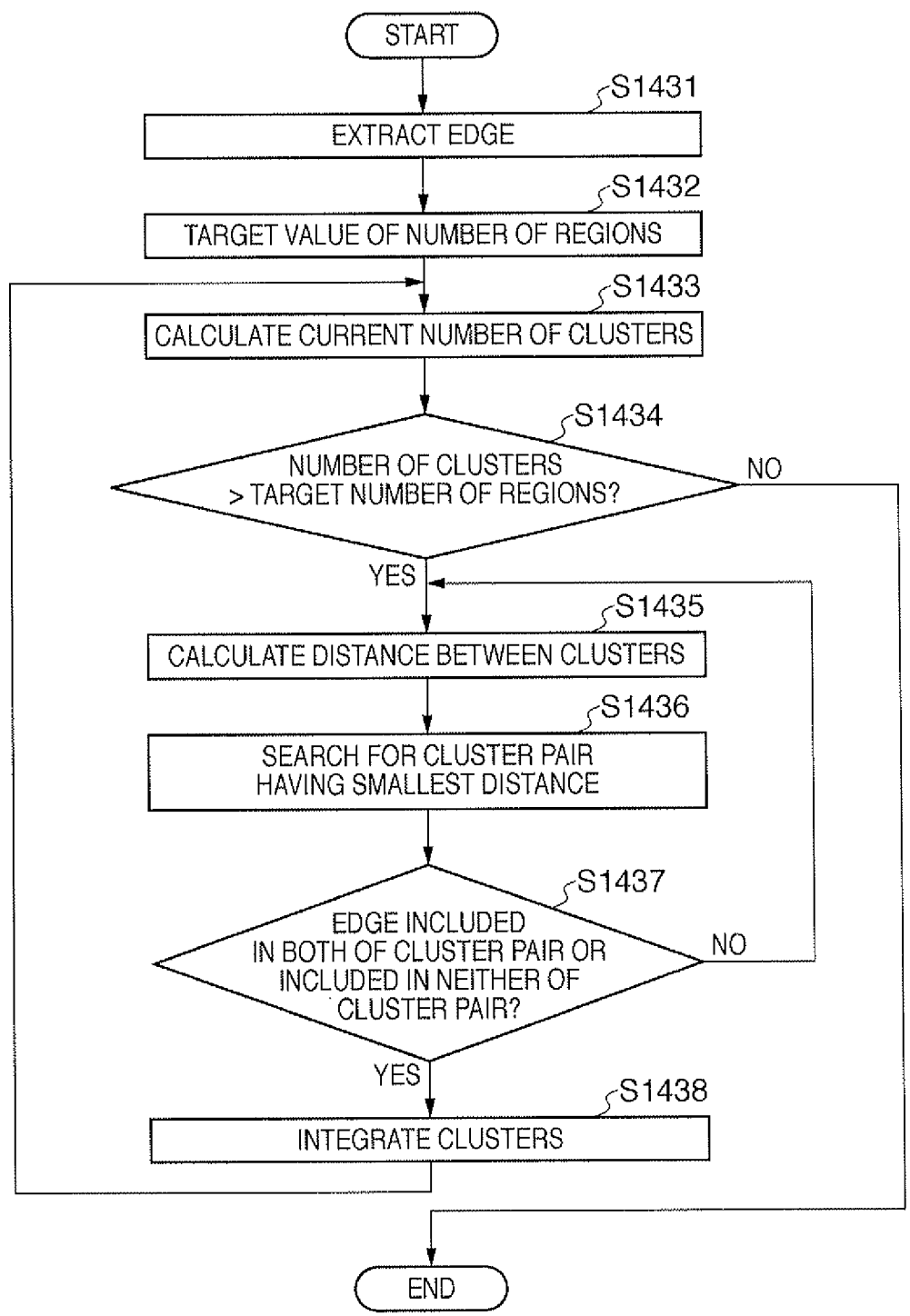
FIG. 7 is a flowchart showing the sequence of cluster integration processing in step S143 in FIG. 5.

The cluster integration processing in step S143 in FIG. 5 will be described below with reference to FIG. 7. In step S1431, the image color separation processing unit 14 extracts a part where a change in color is large (to be referred to as an edge between colors hereinafter) from the image after the lightness correction (FIG. 4) by the processing in step S12. As an edge extraction method, a known Laplacian filter is used, but other edge extraction methods may be used. After the processing in step S1431, for example, a contour line of letter "S" shown in FIG. 4 is extracted as an edge. Note that in this embodiment, pixels on the character image side (foreground side) of those of the boundary between a character image and background are determined as edge pixels.

In step S1432, the image color separation processing unit 14 inputs a target value of clustering (i.e., the target number of separated regions). Note that this target value may be determined in advance by assuming the number of colors which exist within an image. For example, since the number of colors of pens used in case of the whiteboard is small (e.g., as small as six colors), the target number of clusters may be set to be about 12. In step S1433, the unit 14 calculates the current number of clusters processed in step S142.

In step S1434, the image color separation processing unit 14 compares the current number of clusters with the target value. If the current number of clusters is larger than the target value, the unit 14 executes cluster integration processing in steps S1435 to S1438. On the other hand, if the current number of clusters is equal to or smaller than the target value, this processing ends, and the control advances to step S144 shown in FIG. 5.

The image color separation processing unit 14 calculates similarities between clusters in step S1435, and selects two clusters (cluster pair) having the highest similarity in step S1436.

The image color separation processing unit 14 determines in step S1437 if both these two clusters include the edge information extracted in step S1431 or neither of them include any edge information. If a condition in which both the two clusters include the edge information or neither of them include any edge information is met, the unit 14 integrates the two clusters to one cluster in step S1438. That is, if both the two clusters are foreground clusters including edge pixels or they are background clusters including no edge pixels, these clusters are integrated. The cluster integration processing in step S1438 is repeated until the current number of clusters becomes equal to or smaller than the target value. On the other hand, if the aforementioned condition is not met in step S1437 (for example, if either of these clusters includes the edge information), the process returns to step S1435, and the unit 14 detects two clusters having the next highest similarity, and makes determination in step S1437.

As described above, in this embodiment, in case of the cluster integration processing in, e.g., subtractive color processing, whether or not to integrate clusters is determined in consideration of not only a color feature difference but also edge information. As a result, significant parts such as characters and figures including a large number of edges (foreground parts) and a background including nearly no edge can be prevented from being clustered into one region.

<Small Region Processing>

The specifying processing and re-processing of small regions in steps S144 and S145 in FIG. 5 will be described below. In step S144 shown in FIG. 5, the small region determination processing is executed. In step S144, clusters integrated in step S143 are labeled (i.e., to calculate connected pixels of identical colors). The area (for example, the number of pixels included in a region) of each labeled region (i.e., connected pixels) is calculated. When the area of each labeled region is smaller than a predetermined reference value, that region is specified as a noise region (noise region specification).

In step S145, each noise region is re-processed. In step S145, first, a color similarity between each pixel included in the noise region specified in step S144 and a cluster to which a neighboring pixel belongs is calculated. Next, a cluster is changed so that the noise region belongs to the cluster having the highest similarity. For example, this processing may be attained by changing the label of the noise region (an example of region replacement). The specifying processing and re-processing of small regions in steps S144 and S145 can prevent a data size from increasing due to, for example, conversion of noise generated by a compression distortion of a compressed image into vector data intact.

In this embodiment, the thresholds in clustering are similarly set based on the illumination information for both a colorful color part (chromatic region) and a colorless monochrome part (achromatic part) in an image to be processed. However, the thresholds in clustering may be dynamically set in each of the colorful color part and colorless monochrome part using color information and illumination information of the image to be processed.

For example, the image corrected in step S12 is converted from an RGB color space into an HSV color space (an example of saturation information acquisition). Note that H represents hue, S represents chroma, and V represents luminance. Also, the RGB color space may be converted into color spaces other than the HSV color space as long as saturation information can be acquired.

Next, based on S information indicating chroma, the image is divided into a color region and monochrome region. The thresholds in clustering are then dynamically set to have the center of illumination as the center of circle based on the center of illumination and lightness change direction, as described above. In this case, the thresholds in clustering may be dynamically set in correspondence with each of the color region and monochrome region.

Second Embodiment

The second embodiment will be described below. A digital camera input image includes significant parts such as characters, but it may also include unnecessary parts such as a whiteboard cleaner and magnets. Unnecessary information has to be removed from such input image so as to reduce a vector data size. For this purpose, in the second embodiment, unnecessary information such as magnets is deleted from the image after the color separation processing, and that image is converted into vector data.

<Apparatus Arrangement>

Figure 9:
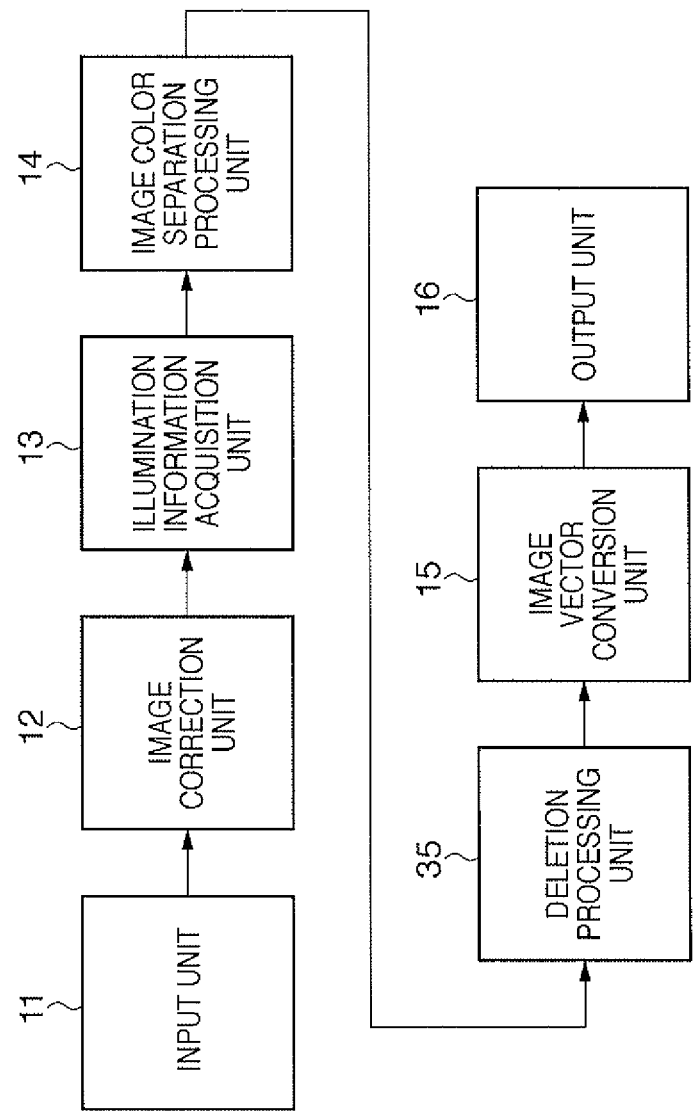
FIG. 9 is a block diagram showing functional blocks of an image processing apparatus, which executes vector conversion of an image that suffers illumination nonuniformity, according to the second embodiment of the present invention.

FIG. 9 is a block diagram showing functional blocks of an image processing apparatus which executes vector conversion of an image that suffers illumination nonuniformity in the second embodiment. As shown in FIG. 9, this image processing apparatus includes an input unit 11 used to input an image which is captured by a digital camera, includes a specific image (illustration and characters), and suffers illumination nonuniformity, and an image correction unit 12 used to apply distortion correction and lightness correction to the input image. This image processing apparatus also includes an illumination information acquisition unit 13 used to acquire information of a center of illumination and lightness change direction from the image that has undergone the lightness correction processing of the image correction unit, and an image color separation processing unit 14 used to separate the image after correction for respective colors. Furthermore, this image processing apparatus includes a deletion processing unit 35 used to remove an unnecessary part from the image color separation result, an image vector conversion unit 15 used to convert contours and color information of respective color regions into vector data, and an output unit 16 used to output the vector result.

<Overview of Vector Conversion Processing of Image That Includes Specific Image (Illustration and Characters) and Suffers Illumination Nonuniformity>

Figure 10:
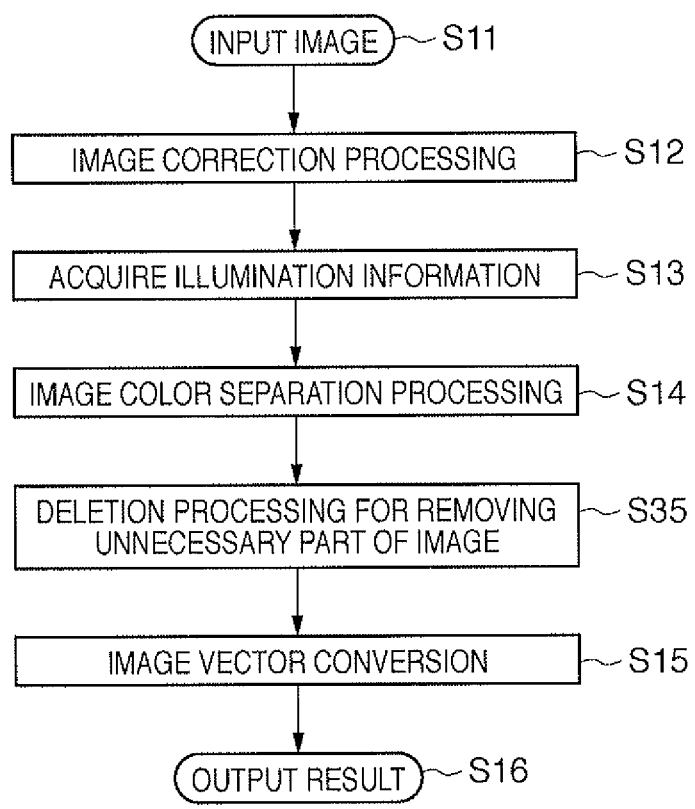
FIG. 10 is a flowchart showing an overview of the sequence of vector conversion processing of an image which includes a specific image (illustration) and suffers illumination nonuniformity.

FIG. 10 is a flowchart showing an overview of the sequence of vector conversion processing of an image which includes a specific image (illustration) and suffers illumination nonuniformity. For example, a CPU 2001 shown in FIG. 13 may execute the processes in respective steps shown in FIG. 10. FIG. 10 will be explained below with reference to FIG. 9. Note that the processes in FIG. 10 denoted by the same step numbers as in FIG. 2 are the same as those described in FIG. 2.

The input unit 11 inputs an image which suffers illumination nonuniformity (step S11). The image correction unit 12 applies distortion correction and lightness correction to the input image (step S12). Next, the illumination information acquisition unit 13 acquires information indicating the center of illumination and lightness change direction from the image after lightness correction in step S12 (step S13). The image color separation processing unit 14 then separates the image into regions for respective colors based on the illumination information acquired in step S13 and color information of respective pixels (step S14).

The deletion processing unit 35 which removes an unnecessary part from an image extracts and deletes unnecessary regions from the respective color regions separated in step S14 (step S35). The image vector conversion unit 15 converts the contours and colors of the respective color regions as a result of the processing in step S14 into vector data (step S15). The output unit 16 outputs the vector result in step S15 (step S16).

FIG. 11 is a view showing an example of an input image including unnecessary parts in this embodiment. In FIG. 11, parts bounded by the bold lines are unnecessary parts.

<Processing for Removing Unnecessary Part of Image>

Figure 12:
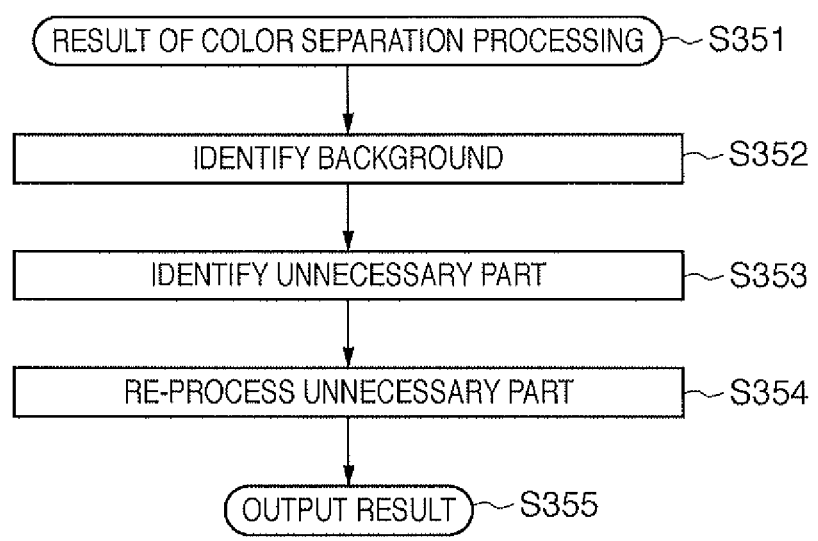
FIG. 12 is a flowchart showing the sequence of deletion processing for extracting and deleting an unnecessary part from each color region of an image after color separation processing in step S35.

The deletion processing for extracting and deleting unnecessary parts from the image in step S35 will be described below with reference to FIG. 12. In step S351, the deletion processing unit 35 receives the color separation processing result in step S14. In this processing, the colors of respective color regions (clusters), and pieces of number information (e.g., labeling information) of regions to which respective pixels belong are acquired.

In step S352, the deletion processing unit 35 identifies a region including a large number of pixels as a background region with reference to the number of pixels included in each color region (cluster) separated by the color separation processing (an example of first region identification). Note that the background is identified based on the number of pixels, but it may be identified using other methods.

In step S353, the deletion processing unit 35 identifies, as an unnecessary region, a region (cluster) which neighbors the background region identified in step S352 and in which the number of pixels is equal to or smaller than a predetermined reference value (an example of second region identification). Note that since a whiteboard cleaner or the like normally exists on a lower portion of the whiteboard, whether or not the region of interest is an unnecessary region may be determined by determining if the number of pixels is equal to or smaller than the reference value and if the position of that cluster corresponds to the lower portion of the image. In addition to the above conditions, whether or not another cluster with an identical color exists in the neighborhood of that cluster may be determined. If such cluster does not exist, it may be determined that the cluster is an unnecessary region; if such cluster exists, it may be determined that the cluster is not an unnecessary region since it may be part of a character cluster. In step S354, the deletion processing unit 35 changes the region number of each pixel included in the unnecessary region identified in step S353 by replacing it by that of a background (an example of unnecessary region replacement). In step S355, the deletion processing unit 35 passes the result in which the unnecessary part is deleted from the image as a result of step S354 to the vector conversion processing in step S15.

In this embodiment, the color region separation processing described in the first embodiment is applied to an input image that suffers illumination nonuniformity, and an unnecessary part is deleted from the image, thus reducing the vector data size of the image. Also, OCR recognition can be executed using the image processing result including only significant parts such as characters and figures.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-235589, filed Sep. 12, 2008, which is hereby incorporated by reference herein in its entirety.

What is claimed is:

1. An image processing apparatus for dividing an image into regions for respective colors, comprising:
an acquisition unit configured to acquire, from an image, illumination information indicating a center of illumination and a lightness change direction; and
a division unit configured to divide the image into regions for respective colors based on the illumination information acquired by said acquisition unit and color information of respective pixels included in the image,
wherein said division unit further comprises:
a threshold setting unit configured to set thresholds in clustering step by step in accordance with the lightness change direction from the center of the illumination information acquired by said acquisition unit;
a clustering unit configured to cluster the image into regions for respective colors in accordance with the thresholds set by said threshold setting unit; and
a region integration unit configured to integrate the regions for respective colors clustered by said clustering unit in accordance with the number of regions which is set in advance.

2. The apparatus according to claim 1, wherein the thresholds in the clustering are values used to determine whether or not a color of a pixel of interest has a similarity to a color of another clustered pixel, and
the similarity is represented by a distance between pixels on a color space.

3. The apparatus according to claim 2, wherein when the distance between pixels is not more than the threshold, said clustering unit determines that the color of the pixel of interest has a high similarity to the color of the other clustered pixel, and assigns the pixel of interest to a cluster to which the similar pixel belongs, and
when the distance is larger than the threshold, said clustering unit determines that the color of the pixel of interest has a low similarity, and assigns the pixel of interest to a new cluster to be generated.

4. The apparatus according to claim 1, wherein said region integration unit further comprises:
an edge extraction unit configured to extract edges where a color change is large from the image;
a selection unit configured to select two regions having colors which have a highest similarity of the regions for respective colors clustered by said clustering unit; and
a determination unit configured to determine if both the two regions selected by said selection unit include the edges extracted by said edge extraction unit, if neither of the two regions include any edges, or if either of the two regions includes the edge, and
when said determination unit determines that both the two regions include the edges extracted by said edge extraction unit or that neither of the two regions include any edges, said region integration unit integrates the two regions.

5. The apparatus according to claim 1, wherein said division unit further comprises:
a noise region specifying unit configured to specify a region including pixels fewer than a predetermined reference value of the regions integrated by said region integration unit as a noise region; and
a region replacing unit configured to compare a color of a pixel included in the specified noise region with a color of a region to which a neighboring pixel belongs, and replaces the specified noise region by a region of a color having a highest similarity.

6. The apparatus according to claim 1, wherein said threshold setting unit further comprises:
a saturation information acquisition unit configured to acquire saturation information; and
a sorting unit configured to sort the regions of the image into a chromatic region and an achromatic region with reference to the saturation information acquired by said saturation information acquisition unit, and
said threshold setting unit sets thresholds used to decide colors step by step in each of the chromatic region and the achromatic region sorted by said sorting unit.

7. The apparatus according to claim 1, further comprising:
a lightness correction unit configured to correct lightness in the input image,
wherein the image is an input image in which the lightness is corrected by said lightness correction unit.

8. The apparatus according to claim 1, further comprising:
a conversion unit configured to convert the regions divided by said division unit into vector data.

9. An image processing method executed by an image processing apparatus for dividing an image into regions for respective colors, said method comprising:

an acquisition step of acquiring, from an image, illumination information indicating a center of illumination and a lightness change direction; and a division step of dividing the image into regions for respective colors based on the acquired illumination information and color information of respective pixels included in the image, wherein said division step further comprises:

a threshold setting step of setting thresholds in clustering step by step in accordance with the lightness change direction from the center of the illumination information acquired by said acquisition step;

a clustering step of clustering the image into regions for respective colors in accordance with the thresholds set by said threshold setting step; and a region integration step of integrating the regions for respective colors clustered by said clustering step in accordance with the number of regions which is set in advance.

10. A non-transitory computer-readable medium storing an image processing program for dividing an image to be processed into regions for respective colors, said program making a computer function to:

acquire, from an image, illumination information indicating a center of illumination and a lightness change direction; and divide the image into regions for respective colors based on the acquired illumination information and color information of respective pixels included in the image, wherein said division step further comprises:

a threshold setting step of setting thresholds in clustering step by step in accordance with the lightness change direction from the center of the illumination information acquired by said acquiring step;

a clustering step of clustering the image into regions for respective colors in accordance with the thresholds set by said threshold setting step; and a region integration step of integrating the regions for respective colors clustered by said clustering step in accordance with the number of regions which is set in advance.

11. An image processing apparatus for dividing an image into regions for respective colors, comprising:

an acquisition unit configured to acquire, from an image, illumination information indicating a center of illumination and a lightness change direction;

a division unit configured to divide the image into regions for respective colors based on the illumination information acquired by said acquisition unit and color information of respective pixels included in the image;

a first region identification unit configured to identify, as a background region, a color region including a largest number of pixels of the regions for respective colors divided by said division unit;

a second region identification unit configured to identify, as an unnecessary region, a region which neighbors the background region identified by said a first region identification unit and includes the number of pixels not more than a predetermined reference value;

an unnecessary region replacing unit configured to replace the identified unnecessary region by the background region; and a conversion unit configured to convert the regions, after the unnecessary region is replaced by the background region, into vector data.

12. An image processing method executed by an image processing apparatus for dividing an image into regions for respective colors, comprising:

an acquisition step of acquiring, from the image, illumination information indicating a center of illumination and a lightness change direction;

a division step of dividing the image into regions for respective colors based on the illumination information acquired in said acquisition step and color information of respective pixels included in the image;

a first region identification step of identifying, as a background region, a color region including a largest number of pixels of the regions for respective colors divided in the division step;

a second region identification step of identifying, as an unnecessary region, a region which neighbors the background region identified in said first region identification step and includes the number of pixels not more than a predetermined reference value;

an unnecessary region replacing step of replacing the identified unnecessary region by the background region; and a conversion step of converting the regions, after the unnecessary region is replaced by the background region, into vector data.

13. A non-transitory computer-readable medium storing an image processing program for dividing an image into regions for respective colors, said program making a computer function to:

acquire, from the image, illumination information indicating a center of illumination and a lightness change direction;

divide the image into regions for respective colors based on the acquired illumination information and color information of respective pixels included in the image;

identify, as a background region, a color region including a largest number of pixels of the divided regions for respective colors;

identify, as an unnecessary region, a region which neighbors the identified background region and includes the number of pixels not more than a predetermined reference value;

replace the identified unnecessary region by the background region; and convert the regions, after the unnecessary region is replaced by the background region, into vector data.

* * * * *